United States Patent [19]

Breault et al.

[11] 4,279,970
[45] Jul. 21, 1981

[54] ELECTROCHEMICAL CELL INCLUDING RIBBED ELECTRODE SUBSTRATES

[75] Inventors: Richard D. Breault, Coventry, Conn.; Glen J. Goller, West Springfield, Mass.; Richard J. Roethlein, Stafford Springs; Gilbert C. Sprecher, Bolton, both of Conn.

[73] Assignee: Electric Power Research Institute, Inc., Palo Alto, Calif.

[21] Appl. No.: 122,857

[22] Filed: Feb. 20, 1980

[51] Int. Cl.³ .............................................. H01M 2/08
[52] U.S. Cl. ......................................... 429/35; 429/41
[58] Field of Search ....................... 429/35, 36, 12, 41, 429/44

[56] References Cited

U.S. PATENT DOCUMENTS

| | | | |
|---|---|---|---|
| 3,867,206 | 2/1975 | Trocciola et al. | 429/41 X |
| 4,017,664 | 4/1977 | Breault | 429/44 |
| 4,035,551 | 7/1977 | Grevstad | 429/41 X |
| 4,115,627 | 9/1978 | Christner et al. | 429/44 |

Primary Examiner—Charles F. LeFevour
Attorney, Agent, or Firm—Flehr, Hohbach, Test

[57] ABSTRACT

An electrochemical cell including an electrolyte retaining matrix layer located between and in contact with cooperating anode and cathode electrodes is disclosed herein. Each of the electrodes is comprised of a ribbed (or grooved) substrate including a gas porous body as its main component and a catalyst layer located between the substrate and one side of the electrolyte retaining matrix layer. Each substrate body includes a ribbed section for receiving reactant gas and lengthwise side portions on opposite sides of the ribbed section. Each of the side portions includes a channel extending along its entire length from one surface thereof (e.g. its outer surface) to but stopping short of an opposite surface (e.g. its inner surface) so as to provide a web directly between the channel and the opposite surface. Each of the channels is filled with a gas impervious substance and each of the webs is impregnated with a gas impervious substance so as to provide a gas impervious seal along the entire length of each side portion of each substrate and between the opposite faces thereof (e.g. across the entire thickness thereof).

8 Claims, 3 Drawing Figures

U.S. Patent        Jul. 21, 1981        4,279,970
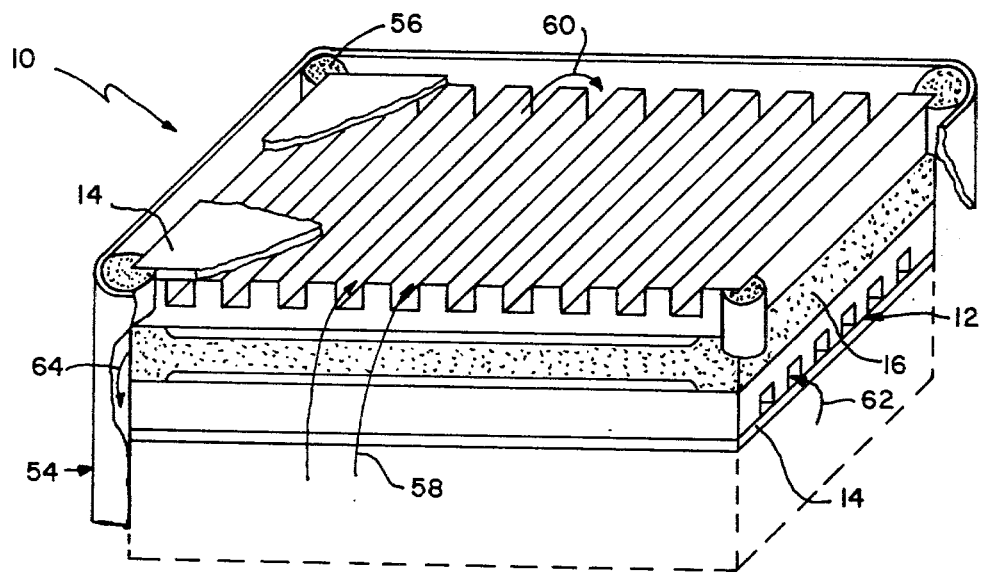
FIG.—1
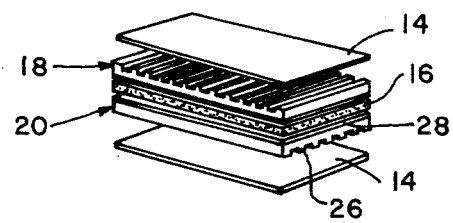
FIG.—2
FIG.—3
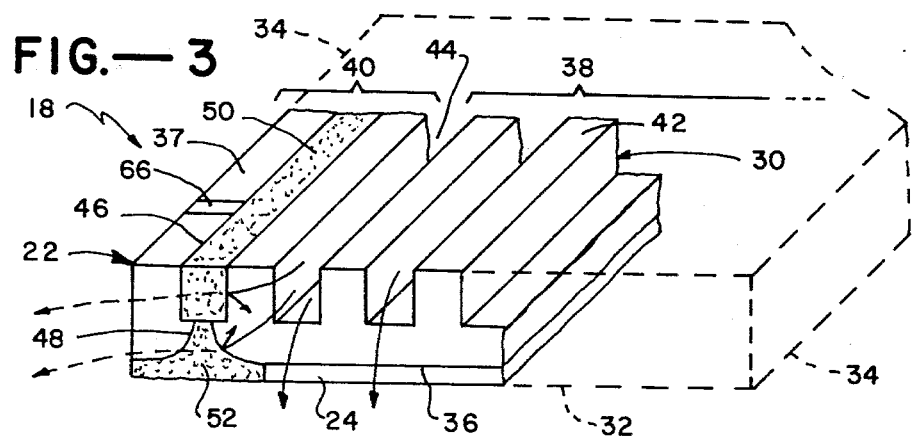

ELECTROCHEMICAL CELL INCLUDING RIBBED ELECTRODE SUBSTRATES

The present invention relates generally to electrochemical cells such as the one disclosed in U.S. Pat. No. 4,115,627 (Christner et al), U.S. Pat. No. 3,867,206 (Trocciola et al), and U.S. Pat. No. 4,035,551 (Grevstad) and the patents cited therein and more particularly to an improvement in cells of this type.

The Christner et al patent just recited discloses a stack of electrochemical fuel cells which are separated from one another by flat gas impermeable separator plates. Each cell includes an electrolyte retaining matrix layer disposed between opposite anode and cathode electrodes. Each of these electrodes is comprised of a substrate including a gas porous body having a ribbed or grooved outer surface to receive reactant gas and a catalyst layer disposed between the substrate and one side of the electrolyte retaining matrix layer. Because of the porosity of each substrate body, some of the reactant gas received at its outer ribbed face diffuses therethrough for contact with the catalyst layer.

While the electrochemical cell disclosed in the Christner et al patent is quite satisfactory for its intended purpose, there is a certain improvement to this cell which is the subject of the present invention. More specifically, while the ribbed sections of each substrate disclosed in Christner et al serve to retain excess electrolyte solution, it has been found that the sections do not contain electrolyte solution throughout their entire thickness, especially after the cell has been operating for a time sufficient to cause some of the excess electrolyte solution to be drawn into and used by the center matrix layer. As a result, reactant gas passing between the ribbed sections is capable of diffusing laterally through the ribbed sections and escaping out along the sidemost ribs (land seals) of the substrate. In one typical cell configuration, hydrogen is provided as one reactant gas and is passed across one of the ribbed substrates while oxygen serving as a second reactant gas is provided across the other ribbed substrate. The importance of preventing the hydrogen from being exposed to the oxygen should be quite apparent. Therefore, in this typical cell configuration, a plenum is provided for these two gases and sealed from one another as carefully as possible using separate seals. Nevertheless, should the hydrogen or oxygen diffuse laterally through a sidemost rib or land seal, it will pass into the otherwise sealed plenum and mix with the other reactant.

In the past, when porous, ribbed substrate configurations of the type disclosed in Christner et al were not used but rather substantially thinner, flat substrates, the latter could be readily provided with wet seals along their edges by impregnating the edges entirely therethrough with appropriate gas impervious material as disclosed in the above-cited Trocciola et al and Grevstad patents. For example, most of the prior substrates, e.g., the flat substrates such as Taiyo Kaken 703 carbon paper, are about 0.010 inch to 0.020 inch thick and have mean pore sizes in the range of 50 to 100 microns. A wet seal can be readily formed along the edges of this relatively thin material by impregnating the edges to reduce its mean pore size. A typical impregnant is 96-98 weight % SiC-2-4 weight % TFE and is generally formulated into an ink suitable for a screen printing process used to impregnate the substrate. While seals of this type function adequately in the relatively thin carbon paper, they have not been found to be adequate in the ribbed substrate of the type disclosed in the Christner et al patent. These ribbed substrates are typically 0.060 to 0.100 inch thick (in the ribbed sections) and typically have pore sizes in the 20 to 40 micron range. The task of impregnating this substrate is obviously more difficult because of its greater thickness and finer pore size. Screen printing of SiC ink solution does not work because at a high enough solids content to fill the substrate the ink does not penetrate the entire thickness of the latter and at a low enough viscosity to get good penetration, the solids content is too low and the substrate does not provide an adequate seal.

In view of the foregoing, an object of the present invention is to provide a technique for overcoming the problem of providing an edge seal in a ribbed or grooved substrate of the general type described in the Christner et al patent and to accomplish this in an uncomplicated, reliable and yet economical manner.

A more specific object of the present invention is to provide a gas impervious edge seal which spans the entire length and thickness of an otherwise porous substrate for use in an electrochemical cell.

Another specific object of the present invention is to provide the edge seal just mentioned throughout the actual thickness of a ribbed substrate without relying entirely on an impregnating process.

Still another specific object of the present invention is to provide a different technique for providing a gas impervious seal at each corner of an otherwise porous, ribbed substrate where the latter has a rectangular outer periphery which is typically the case.

As will be described in more detail hereinafter, the electrochemical cell disclosed herein is one of a number of identical cells stacked on top of or otherwise adjacent to one another and separated by a gas impervious separator plate. Each cell includes an electrolyte retaining matrix layer located between and in contact with a pair of catalyst layers. A pair of substrates are positioned in confronting engagement with the catalyst layers, respectively, and each substrate is comprised of a gas porous main body having an overall outer periphery including opposite ends and opposite lengthwise sides, an inner face adapted for confronting engagement with one of the catalyst layers and an outer face including a section thereof which is provided for receiving reactant gas and which extends lengthwise from one end of the main body to the other end thereof between opposite lengthwise side portions of the main body. Typically, the gas receiving outer face is of a ribbed configuration so as to define lengthwise, spaced apart channels which serve to provide flow paths for the reactant gas.

In accordance with the present invention, each lengthwise side portion of each substrate body just recited includes a channel along its entire length, which channel extends inwardly from one of its inner or outer faces to but stopping short of the other of its faces so as to provide a web directly between the channel and its other face. Each of these channels is filled or otherwise provided with a gas impervious substance and each web is impregnated or otherwise provided with a gas impervious substance so as to provide a seal along the entire length and across the entire thickness of each side portion of each substrate.

A more detailed discussion of the present invention and other aspects thereof will be provided hereinafter in conjunction with the drawings wherein:

FIG. 1 is a perspective view illustrating one section of an overall electrochemical cell assembly including individual electrochemical cells designed in accordance with the present invention;

FIG. 2 is an exploded, perspective view of an electrochemical cell comprising part of the assembly of FIG. 1; and FIG. 3 is an enlarged perspective view illustrating one section of an electrode comprising a part of the electrochemical cell of FIG. 2.

Turning now to the drawings, wherein like components are designated by like reference numerals throughout the three figures, an overall electrochemical cell assembly is illustrated in part in FIG. 1 and generally designated by the reference numeral 10. This assembly includes a plurality of vertically stacked electrochemical cells 12, only one of which is illustrated in FIG. 1. The other cells are symbolically indicated by the phantom lines provided below the cell illustrated. As seen in FIG. 1 and also FIG. 2, the electrochemical cells are separated from one another by flat gas impermeable separator plates 14 which may be made of any known method and of any material which is compatible with and can withstand the operating environment within the cell, as stated in the previously recited Christner et al patent.

As seen best in FIG. 2, each electrochemical cell includes an electrolyte retaining matrix 16 having a cathode electrode 18 disposed on one side thereof and an anode electrode 20 disposed on the other side thereof. As best seen in FIG. 3, the cathode electrode is comprised of a ribbed substrate 22 and a catalyst layer 24 disposed between substrate 22 and the adjoining side of matrix layer 16. Anode 20 is similar to cathode 18 to the extent that the former is comprised of its own ribbed substrate 26 and catalyst layer 28 disposed between the latter and the adjoining side of matrix layer 16. With the exception of certain aspects of each ribbed substrate 22 and 26, the electrochemical cell thus far described may be identical to the one described in the Christner et al patent. Therefore, electrolyte retaining matrix layer 16 may be silicon carbide with a binder such as polytetrafluoroethylene (TFE) described in U.S. Pat. No. 4,017,664 (as recited in Christner et al), or it may be identical to the matrix described in either of the other above recited patents and the electrolyte retained by this matrix layer may be phosphoric acid. The catalyst layers may be platinum-carbon/TFE. While these latter layers are shown adhered to their respective substrates, they may be formed directly to the opposite sides of matrix layer 16.

Referring now to FIG. 3, attention is directed specifically to substrate 22 comprising part of cathode 18. As seen in this latter figure, the substrate includes a main body 30 having an overall outer body periphery (shown partially in phantom) including opposite ends 32 and opposite lengthwise sides 34. Main body 30 also includes an inner, preferably flat, face 36 in confronting engagement with catalyst layer 24 and an outer face 37. The outer face includes a ribbed section 38 extending lengthwise from one end of the main body to its other end between opposite lengthwise edge or side portions 40, one of which is illustrated in FIG. 3. The ribbed section 38 includes a plurality of laterally spaced, upstanding ribs 42 which together with lengthwise side portions 40 define a plurality of laterally spaced channels 44 extending lengthwise from one end 32 of main body 30 to its other end for defining flow paths for reactant gas. As will be discussed in more detail hereinafter, each of the side portions 40 of main body 30 includes a gas impervious seal extending its entire length from one end 32 to its other end and its entire thickness from its inner face 36 to its outer face 37.

With the exception of the gas impervious seal just mentioned, substrate 22 may be identical to the substrate described in the Christner et al patent. However, it is not necessary to the present invention that the substrate be treated to provide both hydrophilic and hydrophobic sections in the manner described in Christner et al.

As stated above, each lengthwise side portion 40 of substrate 22 is provided with a gas impervious seal along its entire length from one end 32 of the substrate to its other end 32 and across its entire thickness. This is accomplished by first milling or otherwise providing a channel 46 in each side portion from top face 37 thereof to but stopping short of the bottom face 36 so as to provide a web 48 directly between channel 46 and face 36. This latter channel and its associated web which is for example only 0.020 inch thick extends the entire length of its associated side portion from one end 32 of substrate 22 to its other end 22.

Once the channel 46 and associated web 48 has been provided in each lengthwise side portion of substrate 22, as described above, the channel is filled or otherwise provided with a gas impervious or potentially impervious substance 50 so as to prevent the reactant gas within channels 44 from passing laterally therethrough. In like manner, the web 48 is impregnated or otherwise provided with gas impervious or potentially impervious material 52. Because of the web's relative thinness, e.g., 0.020 inch, it is possible to impregnate its entire thickness with material 52 as indicated in FIG. 3. In this way, material 52 serves as a barrier or potential barrier to the passage of reactant gas from channel 44 across the web. Between this barrier and the seal in channel 46, a complete gas barrier or potential barrier is provided along the length and across the thickness of each side portion 40. It has been found that to insure impregnating the thickness of web 48, it is preferable to impregnate the latter before caulking the channel 46 with substance 50.

In a preferred and actual working embodiment, the substance 50 and the substance 52 are in part comprised of wettable material which by themselves are not gas impervious but which when combined with excess electrolyte solution, e.g. the phosphoric acid, provide the gas impervious wet seal described. In other words, the substances 50 and 52 when initially provided are only part of gas impervious mixtures including the substances and the excess electrolyte solution. This excess electrolyte solution impregnates (or soaks) the substances 50 and 52 when the electrolyte is added to the electrode. The pores in the substances are sufficiently small so that this combination provides an effective gas seal. With regard to the impregnating material 52, the latter not only provides wicking but also reduces significantly the mean pore size of the associated porous web. In this preferred and actual working embodiment, both of the sealing substances discussed above utilize SiC as a primary component. The SiC may be that typically used which is a 1,000 grit SiC from Carborundum having a mean particle size of about 5 microns. However, in a preferred embodiment, the SiC used is one which has a mean particle size of about 2.0 microns.

With respect to the impregnating substance 52, the SiC just mentioned is prepared as an ink and an SiC weight gain of 0.7 to 0.8 grams per cubic centimeter is desired. The typical ink substance 52 is shown below in Table I.

TABLE I

| | Ribbed Substrate Wet Seal Ink | | |
|---|---|---|---|
| Material | 61% | 62% | 63% |
| SiC 2.0 μ | 1200 g. | 1200 g. | 1200 g. |
| D. I. H$_2$O | 820 ml. | 785 ml. | 752 ml. |
| Triton X-100 | 81 g. | 81 g. | 81 g. |
| 63% TFE-30 | 19 g.(dispersion) 12 g. solids | 19 g.(dispersion) 12 g. solids | 19 g.(dispersion) 12 g. solids |

Table I above gives three examples of the SiC to be used in impregnating web 48. One of these examples includes a 61% solids content. The others include 62% solid content and 63% solids content. The SiC has a mean particle size of 2.0 microns in all examples. The triton X100 is a surfactant manufactured by Rohm and Hass, Philadelphia, Pa., the 63% TFE-30 is a colloidial Teflon dispersion manufactured by E.I. Dupont Company, Wilmington, Del.

A preferred method of preparing any one of the SiC inks recited in Table I includes first measuring the water into a clean two liter beaker. The Triton X100 placed into the water where it is heated and stirred using low heat and a magnetic stirrer. The TFE-30 dispersion is then added directly to the Triton/H$_2$O solution and stirred for 5 minutes. Finally, a preweighed batch of SiC is slowly added to the H$_2$O Triton/TFE solution and stirred with a propeller type stirrer and thereafter the entire mixture is subjected to an ultrasonic blend for 5 minutes.

The typical mixture 50 is shown in Table II below. This mixture is thicker than the one just described and, in fact, in a preferred embodiment is extruded into its associated channel 46 by means of a conventional caulking gun.

TABLE II

| Ribbed Substrate Channel Caulking Ink |
|---|
| 69% solids |
| 1.7% TFE-30 |
| .002 grams Carbopol 962/gram SiC |
| Typical Batch:     585. ml. D. I. H$_2$O |
| 35. g. TFE-30 63% dispersion |
| 2.6 g Carbopol #962 |
| 1300 g. SiC, 2.0 μ |

From Table II, it can be seen that the SiC is of the same type as in Table I, that is, one including a mean particle size of 2.0 microns. The same 63% dispersion of TFE 30 is used. In addition, No. 962 carbopol manufactured by B. F. Goodrich chemical Company, Cleveland, Ohio is used. The procedure in providing this overall mixture includes first measuring the H$_2$O into a Hobart mixing bowl and thereafter adding the TFE-30 to the water while stirring slowly. The SiC is weighed in a dry container and combined in this dry state with the carbopol No. 962. This dry mix is slowly added to the water/TFE solution maintaining a slow stirring speed.

Both the mixture just described and the impregnating mixtures recited in Table I must be heated to remove the volatile constituents of the inks and to melt the TFE which bonds the SiC together. The sintering time is preferably between one and five minutes and the sintering temperature is preferably between 580° and 620° F.

While Tables I and II illustrate preferred and actual working embodiments of substances which when combined with the electrolyte making up cells 12 provided the seals described, it is to be understood that the present invention is not limited specifically to these examples. Other materials which function in the same way and which are otherwise compatible with the present invention may be selected.

Having described substrate 22, it is to be understood that the substrate 26, with one exception may be identical to the substrate 22 just described. The difference between these two substrates resides in the location of their channels. As seen best in FIG. 2, all of the channels in the substrate 22 are vertically upwardly directed and all of the channels in the substrate 26 are vertically downwardly directed. In addition, the channels in the top substrate are normal to the channels in the bottom substrate. In this way, reactant gas of one kind, e.g. hydrogen, is passed through one group of the channels 44 while the other reactant gas, e.g. oxygen, is passed through the other group of channels 44. The purpose of the lengthwise edge or side seals described above is, of course, to prevent these two gases from combining with one another. In order to further prevent this from occurring, the overall assembly 10 includes an outer housing 54 surrounding the stacked cells and including vertically extending corner seals 56. While housing 54 is shown as a continuous section, in a preferred embodiment it is formed from four distinct sections which are clamped together at their corners. With the housing and seals assembled in the manner shown in FIG. 1, a plenum is provided on each side of the cell stack. One plenum serves to direct reactant gas into the channels 44 in substrates 22, as indicated by arrows 58. A second cooperating plenum serves to receive and to pass out the reactant gas in these last mentioned channels, as indicated by the arrows 60. A third plenum serves to direct the second reactant gas into the channels 44 of substrates 26, as indicated by arrows 62 and, finally, a last plenum is used to collect and pass away the last mentioned reactant gas as indicated by the arrows 64.

As stated above, each of the corners of the stacked cells is provided with a corner seal 56. This seal is constructed of gas impervious material and serves to prevent mixing of the two reactant gases. In order to accomplish this, each of the side portions 40 must be provided with a cross-channel 66 (indicated only in FIG. 3) extending all the way down to web 48 from channel 46 to the adjacent side 34. This cross-channel is filled with the same substance 50 and its associated web is impregnated in the same manner as webs 48 for providing a gas impervious barrier when combined or impregnated with the electrolyte solution.

What is claimed is:

1. In an electrochemical cell including an electrolyte retaining matrix layer located between and in contact with a pair of catalyst layers, a pair of substrates to be positioned in confronting engagement with said catalyst layers, respectively, each of said substrates comprising a gas porous main body having an overall outer periphery including opposite ends of opposite lengthwise sides, an inner face adapted for confronting engagement with one of said catalyst layers and an outer face including a ribbed section thereof which is provided for receiving reactant gas and which extends lengthwise from one end of said main body to the other end thereof between opposite lengthwise side portions of said main body, each of said lengthwise side portions including along its entire length between the opposite ends of said main body a channel extending inwardly therein from one of said inner or outer faces to but stopping short of the other of said faces so as to provide a web directly between said channel and said other face, each of said channels being filled with a gas impervious substance and each of said webs being impregnated with a gas impervious substance so as to provide a gas impervious seal along the entire length of each of said side portions and between the opposite faces thereof.

2. A pair of substrates according to claim 1 including a cross channel adjacent to the end of each of said side portions and extending from an adjacent side of said first-mentioned channels to an adjacent side of said main body, each of said cross channels extending into its side portion from said face to but stopping short of said other face so as to provide a cross web directly between said cross channel and said other face, each of said cross channels being filled with a gas impervious substance so as to provide a gas impervious seal across each end of each of said side portions.

3. A pair of substrates according to claim 1 wherein each of said outer face sections contains a plurality of spaced channels which provide flow paths for reactant gas and which extend lengthwise from one end of said main body to the other end thereof.

4. A pair of substrates according to claim 3 wherein said channels extend from the outer faces of said main bodies to but stop short of the opposite interfaces thereof.

5. An electrochemical cell comprising an electrolyte retaining matrix layer located between and in contact with a pair of catalyst layers, a pair of substrates positioned in confronting relationship with said catalyst layers, respectively, each of said substrates including a gas porous main body having an overall outer periphery including opposite ends and opposite lengthwise sides, an inner face adapted for confronting engagement with one of said catalyst layers and an outer face including a ribbed section thereof which is provided for receiving reactant gas and which extends lengthwise from one end of said main body to the other end thereof between opposite lengthwise side portions of said main body, each of said lengthwise side portions including along its entire length between the opposite ends of said main body a channel therein extending inward from one of said faces to but stopping short of the other of said faces so as to provide a web directly between said channel and said other face, each of said channels being filled with a gas impervious substance and each of said webs being impregnated with a gas impervious substance so as to provide a gas impervious seal along the entire length of each of said side portions and between the opposite faces thereof.

6. An electrochemical cell according to claim 5 including an electrolyte solution retained in and by said matrix layer and wherein each of said gas impervious substances includes an electrolyte retaining substance and electrolyte solution retained by the latter whereby to provide a wet seal.

7. An electrochemical cell comprising an electrolyte retaining matrix layer, first and second catalyst layers on opposite sides of and in contact with said matrix layer, and first and second substrates respectively positioned in confronting relationship with said first and second catalyst layers opposite said matrix layer, each of said substrates including a gas porous main body having an overall outer periphery including opposite ends and opposite lengthwise sides, a substantially flat inner face in contact with its confronting catalyst layer and an opposite outer face containing a plurality of spaced grooves which provide flow paths for reactant gas and which extend lengthwise from one end of said main body to the other end thereof between opposite lengthwise side portions of said main body, each of the lengthwise side portions including along its entire length a channel extending therein from one face to but stopping short of the opposite face so as to provide a web directly between said channel and opposite face, each of said channels being filled with a gas impervious substance and each of said webs being impregnated with a gas impervious substance so to provide a gas impervious seal along the entire length of each of said side portions between the opposite faces thereof.

8. An electrochemical cell according to claim 7 wherein said one face of each of said main bodies is said outer face and wherein said catalyst layers are respectively fixedly connected to the inner faces of said first and second substrates, respectively, between the side portions thereof.

* * * * *